(12) United States Patent
Turini et al.

(10) Patent No.: US 7,377,235 B2
(45) Date of Patent: May 27, 2008

(54) HEAT EXCHANGER FOR HYDROGEN-OPERATED FUEL SUPPLY SYSTEMS

(75) Inventors: Juergen Turini, Maisach (DE); Johann Schnagl, Neuried (DE); Christopher von Kuensberg Sarre, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/724,186

(22) Filed: Mar. 15, 2007

(65) Prior Publication Data

US 2007/0193717 A1 Aug. 23, 2007

Related U.S. Application Data

(63) Continuation of application No. PCT/EP05/08352, filed on Aug. 2, 2005.

(30) Foreign Application Priority Data

Sep. 21, 2004 (DE) .................. 10 2004 045 638

(51) Int. Cl.
*F02B 43/00* (2006.01)
*F02B 9/00* (2006.01)
(52) U.S. Cl. .................. 123/1 A; 123/3; 123/DIG. 12; 165/157; 429/20
(58) Field of Classification Search .............. 123/1 A, 123/3, 527, 557, DIG. 12; 165/157–163, 165/DIG. 348, DIG. 351; 429/20
See application file for complete search history.

(56) References Cited

U.S. PATENT DOCUMENTS 4,386,309 A 5/1983 Peschka 5,871,045 A * 2/1999 Hirth et al. .................. 165/157
6,634,178 B1 10/2003 Michel et al.

FOREIGN PATENT DOCUMENTS

| DE | 1 060 792 | 7/1959 |
|---|---|---|
| DE | 42 19 912 A1 | 12/1993 |
| DE | 42 44 328 A1 | 6/1994 |
| DE | 43 20 556 A1 | 12/1994 |
| DE | 295 10 530 U1 | 10/1995 |
| DE | 195 06 486 A1 | 9/1996 |
| DE | 100 60 786 A1 | 6/2002 |
| EP | 0 779 468 B1 | 6/1997 |
| JP | 63-246459 A | 10/1988 |
| JP | 2003-130920 A | 5/2003 |

OTHER PUBLICATIONS

German Search Report dated Feb. 3, 2006 with English translation of relevant portion (Nine (9) pages).
International Search Report dated Nov. 30, 2005 with English translation (Six (6) pages).

* cited by examiner

*Primary Examiner*—Noah P. Kamen
(74) *Attorney, Agent, or Firm*—Crowell & Moring LLP

(57) ABSTRACT

A fuel supply system for an internal combustion engine operable using hydrogen and/or for a fuel cell includes a hydrogen tank, which is provided for storing deep-cooled, liquid hydrogen, and a heat exchanger, which is provided for preheating the deep-cooled hydrogen. The heat exchanger is enclosed by a fluid-tight mantle. An intermediate space is provided between the heat exchanger and the mantle, which has a fluid flowing through it, which delivers heat to the heat exchanger and insulates the heat exchanger in relation to the surroundings.

19 Claims, 1 Drawing Sheet

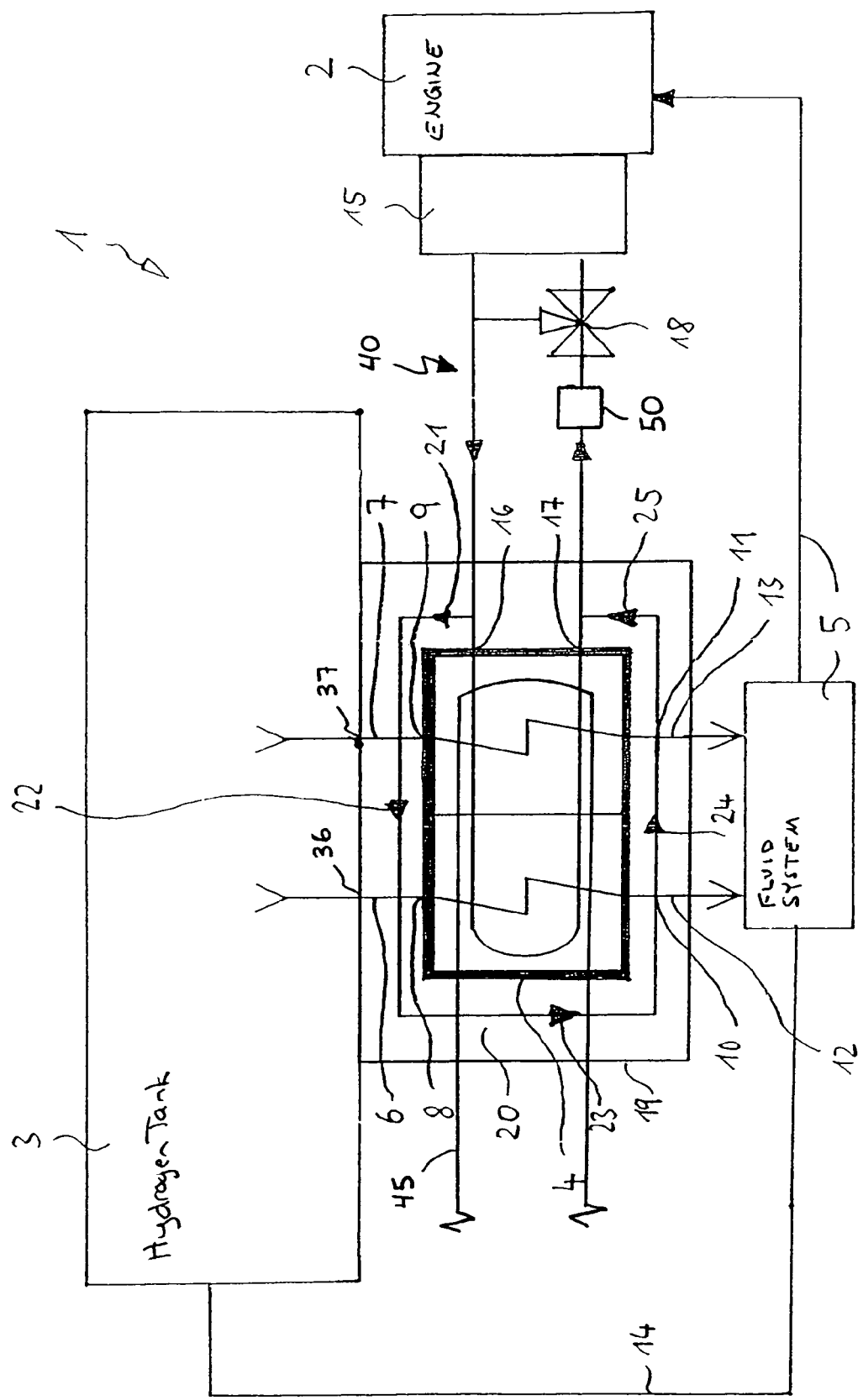

HEAT EXCHANGER FOR HYDROGEN-OPERATED FUEL SUPPLY SYSTEMS

CROSS-REFERENCE TO RELATED APPLICATIONS

This application is a continuation of PCT International Application No. PCT/EP2005/008352, filed Aug. 2, 2005, which claims priority under 35 U.S.C. § 119 to German Application No. 10 2004 045 638.0, filed Sep. 21, 2004, the entire disclosures of which are expressly incorporated by reference herein.

BACKGROUND AND SUMMARY OF THE INVENTION

The present invention relates to a fuel supply system. For some time, vehicles having hydrogen-operated internal combustion engines have been researched. There are two opposing approaches in regard to the storage of the hydrogen required for operating the internal combustion engine, namely storing gaseous hydrogen at ambient temperature and very high pressure, and storing liquid, cryogenic hydrogen at a temperature of approximately −250° C. and relatively low pressure. The storage of cryogenic hydrogen has the advantage that a higher energy density is achieved than in the storage of gaseous hydrogen. In order to keep the hydrogen liquid for a long time, i.e., multiple weeks, the hydrogen tank must be insulated extremely well. Nonetheless, a certain heat input into the hydrogen tank and thus a continuous vaporization of small quantities of liquid hydrogen are unavoidable. In order to limit the pressure increase in the hydrogen tank, a small quantity of vaporized hydrogen must be discharged to the surroundings during longer shut-down times of the vehicle. The hydrogen to be discharged may be oxidized to form water, i.e., brought into a harmless state.

For the operation of the internal combustion engine, the liquid, cryogenic hydrogen must be preheated from approximately −250° C. to a temperature which is above the ambient temperature. This is already necessary because seals of the fuel system would become brittle and leaky at temperatures that low, which would result in malfunctions at various components of the fuel system, e.g., valves.

If the hydrogen was not preheated as it flowed out of the hydrogen tank, very low temperatures would also occur on the surfaces of the individual fuel system components, i.e., on the surfaces of the fuel lines, on the valves, etc. This would in turn result in the moisture contained in the ambient air condensing locally. The condensed water would freeze immediately on the component surfaces, which would gradually result in complete icing of the fuel system. Because of the extremely low temperature of the hydrogen, the danger would even exist that the ambient air would be liquefied locally in the area of these extremely cold components and/or that oxygen would be distilled out of the ambient air. All of these effects are undesirable and involve significant hazards.

Preheating the hydrogen provided for the combustion in a heat exchanger to a temperature which lies above the ambient temperature is already known from the prior art, the heating power required for the preheating, which is in a range between 20 and 25 kW in experimental engines, being withdrawn from the coolant loop of the internal combustion engine. The heat dissipated unused to the surroundings in typical internal combustion engines via the radiator is thus used for preheating the hydrogen.

The object of the present invention is to provide a fuel supply system for either an internal combustion engine operable using hydrogen or for a fuel cell, in which the hydrogen taken from the hydrogen tank is preheated, it being ensured that the temperatures on surfaces of the individual components of the fuel system are at least equal to the temperature of the ambient air.

The present invention is directed to a fuel supply system for an internal combustion engine operable using hydrogen or for a fuel cell, a hydrogen tank and a heat exchanger being provided. Deep-cooled liquid hydrogen is stored in the hydrogen tank. The stored hydrogen has a temperature which is in the range of approximately −250° C. The heat exchanger is provided for heating the hydrogen taken from the hydrogen tank. The hydrogen is preheated by the heat exchanger from the temperature existing in the hydrogen tank to a temperature which is equal to the ambient temperature or above the ambient temperature. The heat exchanger has a fuel intake, which is connected to the hydrogen tank. From the fuel intake, the hydrogen flows through the hydrogen area of the heat exchanger to a fuel outlet, via which the preheated hydrogen is discharged from the heat exchanger. The heat exchanger also has a coolant intake, via which hot coolant flows from the coolant loop of the internal combustion engine and/or the fuel cell into a coolant area, which is thermally connected to the hydrogen area. In the heat exchanger, the hot coolant delivers heat to the hydrogen and subsequently flows back out of the heat exchanger via a coolant outlet.

The core of the present invention is that the heat exchanger is enclosed by a fluid-tight mantle and/or a fluid-tight envelope. The mantle or envelope may have the form of a box. The mantle may also have the form of a tube, a circular cylinder, or a tank having convex front faces, as is known from tanker vehicles. An intermediate space is provided between the mantle and the heat exchanger, which has a fluid flowing through it. The temperature and the volume flow of the fluid flowing through the intermediate space are tailored in such a way that it is ensured that the temperature on the surface of the mantle is at least equal to the ambient temperature or lies above it. It is thus ensured that neither the ambient air nor the moisture contained therein condenses in the area of the heat exchanger, i.e., on the surface of the mantle. Therefore, icing of the heat exchanger and/or the mantle enclosing the heat exchanger and the downstream components of the fuel system are avoided. In particular, the ambient air is prevented from liquefying locally in the area of the heat exchanger, i.e., oxygen is prevented from distilling out of the ambient air. The components of the fuel system situated after the heat exchanger also are at least at ambient air temperature, because the hydrogen already preheated in the heat exchanger flows through them.

The mantle which encloses the heat exchanger may be flanged directly onto the hydrogen tank. It is thus ensured that all components of the fuel system in which cryogenic hydrogen is located have at least ambient air temperature on their surface.

The mantle which encloses the heat exchanger is preferably impermeable to hydrogen. Therefore, even in the event of a leak in the hydrogen area of the heat exchanger and/or at one of the components of the fuel system inside the mantle which hydrogen flows through, hydrogen may not escape uncontrolled into the ambient air. In addition, a hydrogen sensor may be situated in the intermediate space between the mantle and the heat exchanger and/or in the fluid loop which supplies the intermediate space with fluid, which detects an exit of hydrogen from the heat exchanger into the intermediate space and thus into the fluid loop in case of a leak in one of the hydrogen-conducting components of the fuel system.

The heat exchanger may be connected to the hydrogen tank via multiple lines which hydrogen flows through. Preferably, the heat exchanger is connected via a central coupling to the hydrogen tank. The term central coupling is to be understood to mean that a detachable line coupling is situated in each of the individual connection lines between the hydrogen tank and the heat exchanger. The hydrogen tank and the heat exchanger are therefore detachably connected to one another. This is not only advantageous in regard to mounting and/or dismounting, but rather allows the hydrogen tank and the heat exchanger to be manufactured, tested, and/or optimized independently of one another.

Valves and diverse sensors may be situated shielded in a secondary system capsule in the area between the hydrogen tank and the heat exchanger. The secondary system capsule preferably has hot coolant flowing against it and/or through it. It may thus be ensured that the valves and sensors situated in the secondary system capsule are kept at a certain minimum operating temperature, which is important for perfect functioning of these components. If the valves were not heated, their seals would become brittle, which could result in leaks.

The intermediate space between the mantle and the heat exchanger may be connected to the coolant loop of the internal combustion engine. For the application of a fuel cell, the intermediate space may be connected to the coolant loop of the fuel cell. The intermediate space may be directly connected to the coolant area of the heat exchanger. As an alternative, the intermediate space may also be connected to a separate coolant loop, which is separated from the coolant loop of the internal combustion engine and/or the fuel cell. The intermediate space therefore does not necessarily have to have coolant of the coolant loop of the internal combustion engine and/or the fuel cell flowing through it, but rather may also have another suitable medium flowing through it.

The mantle may be implemented very rigidly as a protective mantle, which protects the heat exchanger and the line system situated inside the mantle from mechanical damage in the event of an accident.

Other objects, advantages and novel features of the present invention will become apparent from the following detailed description of the invention when considered in conjunction with the accompanying drawing. The single FIGURE shows the basic principle of the present invention in a schematic illustration.

BRIEF DESCRIPTION OF THE DRAWING

The single FIGURE shows in schematic representation a fuel supply system for an internal combustion engine.

DETAILED DESCRIPTION OF THE DRAWING

The FIGURE shows a fuel supply system 1 for an internal combustion engine 2 operable using hydrogen. The fuel supply system 1 has a hydrogen tank 3, in which liquid hydrogen is stored, a heat exchanger 4, and a fluid system 5, only shown in extremely schematic form here, which connects the heat exchanger 4 to the internal combustion engine and may comprise lines, valves, injection nozzles, etc. and which is primarily provided for the purpose of supplying hydrogen from the heat exchanger 4 to the internal combustion engine 2.

The fuel tank 3 is connected via a partial flow line 6 and a main flow line 7 to a first fuel intake 8 and a second fuel intake 9, respectively, of the heat exchanger. The first fuel intake 8 has a fluid connection to a first fuel outlet 10 and the second fuel intake 9 has a fluid connection to a second fuel outlet 11. The fuel outlets 10, 11 are in turn connected via connection lines 12, 13 to the fluid system 5, which supplies the internal combustion engine 2 with preheated hydrogen and, if needed, conducts a small part of the preheated hydrogen back into the hydrogen tank 3 via a line 14. By returning preheated hydrogen into the hydrogen tank 3, a part of the liquid hydrogen contained in the hydrogen tank may be vaporized during the operation of the internal combustion engine. A sufficiently high pressure may thus always be maintained in the hydrogen tank during operation of the internal combustion engine, by which the use of a cryopump may be dispensed with.

The internal combustion engine 2 is cooled by a radiator 15. Hot coolant is pumped by a coolant pump (not shown here) via a coolant intake 16 into the heat exchanger 4. The coolant delivers heat to the hydrogen and preheats it in the heat exchanger 4. The cooled coolant flows back in the direction of the radiator 15 via a coolant outlet 17. The coolant intake 16 and the coolant outlet 17. which form a portion of fluid loon 40. may be short-circuited via a thermostat valve 18. The thermostat valve 18 is regulated in such a way that a predefined set point temperature of 50° C. for example, is maintained at the coolant outlet 17 of the heat exchanger 4. As shown in the figure, a hydrogen sensor 50 is situated in fluid loop 40 so as to detect an exit of hydrogen from the heat exchanger.

As is obvious from the figure, the heat exchanger 4 is enclosed by a mantle 19. In the exemplary embodiment shown here, the mantle 19 is flanged directly onto the fuel tank 3. The mantle 19 is situated at a distance from the heat exchanger 4. The intermediate space 20 between the mantle 19 and the heat exchanger 4 has coolant of the coolant loop flowing through it, which is only indicated schematically here by arrows 21-25. It is thus ensured that the temperature on the surface of the mantle 19 is at least the external temperature or higher. As an alternative, the intermediate space may also be connected to a separate coolant loon 45, which is separated from the coolant loop of the internal combustion engine and/or the fuel cell.

Line couplings 36, 37 may be situated in each of the lines 6, 7 via which the hydrogen tank 3 is connected to the heat exchanger 4. The hydrogen tank 3 is detachably connected to the heat exchanger via the line couplings. The line couplings 36, 37 and diverse sensors (not shown) may be situated separately in a secondary system capsule (not shown) situated between the hydrogen tank 3 and the heat exchanger 4. The secondary system capsule has hot coolant flowing against it or through it, which ensures that the valve and sensors situated therein are kept at a certain minimum operating temperature, which is necessary for perfect functioning.

The foregoing disclosure has been set forth merely to illustrate the invention and is not intended to be limiting. Since modification of the disclosed embodiments incorporating the spirit and substance of the invention may occur to persons skilled in the art, the invention should be construed to include everything within the scope of the appended claims and equivalents thereof.

We claim:

1. A fuel supply system for at least one of an internal combustion engine operable using hydrogen or a fuel cell, said fuel supply system comprising:

a hydrogen tank, which is provided for storing deep-cooled, liquid hydrogen, and a heat exchanger, which is provided for preheating the deep-cooled hydrogen, the heat exchanger including:

at least one fuel intake, which has a fluid connection to the hydrogen tank;

at least one fuel outlet, which has a fluid connection to the fuel intake, via which preheated hydrogen is discharged from the heat exchanger, at least one coolant intake, via which hot coolant from a coolant loop of the internal combustion engine and/or the fuel cell is supplied to the heat exchanger, and at least one coolant outlet, which has a fluid connection to the coolant intake, via which cooled coolant, which has delivered heat to the hydrogen, is discharged from the heat exchanger, wherein the heat exchanger is enclosed by a fluid-tight mantle, an intermediate space being provided between the heat exchanger and the mantle, which has a fluid flowing through it, which delivers heat to the heat exchanger and insulates the heat exchanger in relation to its surroundings.

2. The fuel supply system according to claim 1, wherein the mantle is impermeable to hydrogen.

3. The fuel supply system according to claim 1, wherein the intermediate space is connected to a fluid loop in which a hydrogen sensor is situated, the hydrogen sensor detecting an exit of hydrogen from the heat exchanger into the fluid loop.

4. The fuel supply system according to claim 1, wherein the hydrogen tank is connected via multiple flow lines to the heat exchanger.

5. The fuel supply system according to claim 4, wherein a detachable line coupling is situated in each of the flow lines, so that the hydrogen tank is detachably connected to the heat exchanger.

6. The fuel supply system according to claim 5, wherein the line couplings, which have the deep-cooled hydrogen flowing through them, are in thermal connection with the fluid flowing in the intermediate space and are thus kept above a predefined minimum operating temperature.

7. The fuel supply system according to claim 1, wherein the intermediate space is connected to the coolant loop of the internal combustion engine and has hot coolant flowing through it.

8. The fuel supply system according to claim 1, wherein the intermediate space is connected to a separate coolant loop, which is partitioned from the coolant loop of the internal combustion engine.

9. The fuel supply system according to claim 1, wherein a thermostat valve is situated in the coolant loop of the internal combustion engine, by which the temperature of the coolant at the coolant outlet of the heat exchanger is regulated to a predefined set point temperature.

10. The fuel supply system according to claim 9, wherein the coolant outlet and the coolant intake may be brought into fluid connection with one another via the thermostat valve.

11. A component of a fuel supply system for at least one of an internal combustion engine operable using hydrogen or a fuel cell, the component comprising:

a heat exchanger;

a fluid-tight mantle enclosing the heat exchanger so as to define an intermediate space therebetween through which an amount of fluid flow effective to deliver heat to the heat exchanger and insulate the heat exchanger in relation to its surroundings is flowable;

a fluid loop connected to the intermediate space; and a hydrogen sensor situated in the fluid loop, the hydrogen sensor detecting an exit of hydrogen from the heat exchanger into the fluid loop.

12. The component according to claim 11, wherein the mantle is impermeable to hydrogen.

13. The component according to claim 11, wherein a hydrogen tank of a fuel supply system is connected via multiple flow lines to the heat exchanger.

14. The component according to claim 13, wherein a detachable line coupling is situated in each of the flow lines, so that the hydrogen tank is detachably connected to the heat exchanger.

15. The component according to claim 14, wherein the line couplings are in thermal connection with fluid flowing in the intermediate space and are thus kept above a predefined minimum operating temperature.

16. The component according to claim 11, wherein the intermediate space is connected to a coolant loop of an internal combustion engine and has hot coolant flowing through it.

17. The component according to claim 16, wherein the intermediate space is connected to a separate coolant loop, which is partitioned from the coolant loop of the internal combustion engine.

18. The component according to claim 16, wherein a thermostat valve is situated in the coolant loop of the internal combustion engine, by which the temperature of the coolant at a coolant outlet of the heat exchanger is regulated to a predefined set point temperature.

19. The component according to claim 18, wherein a coolant outlet of the heat exchanger and a coolant intake of the heat exchanger may be brought into fluid connection with one another via the thermostat valve.

* * * * *